May 28, 1957 R. J. STOCK ET AL 2,793,993
ELECTROLYTIC TREATING APPARATUS
Original Filed April 10, 1950 6 Sheets-Sheet 1
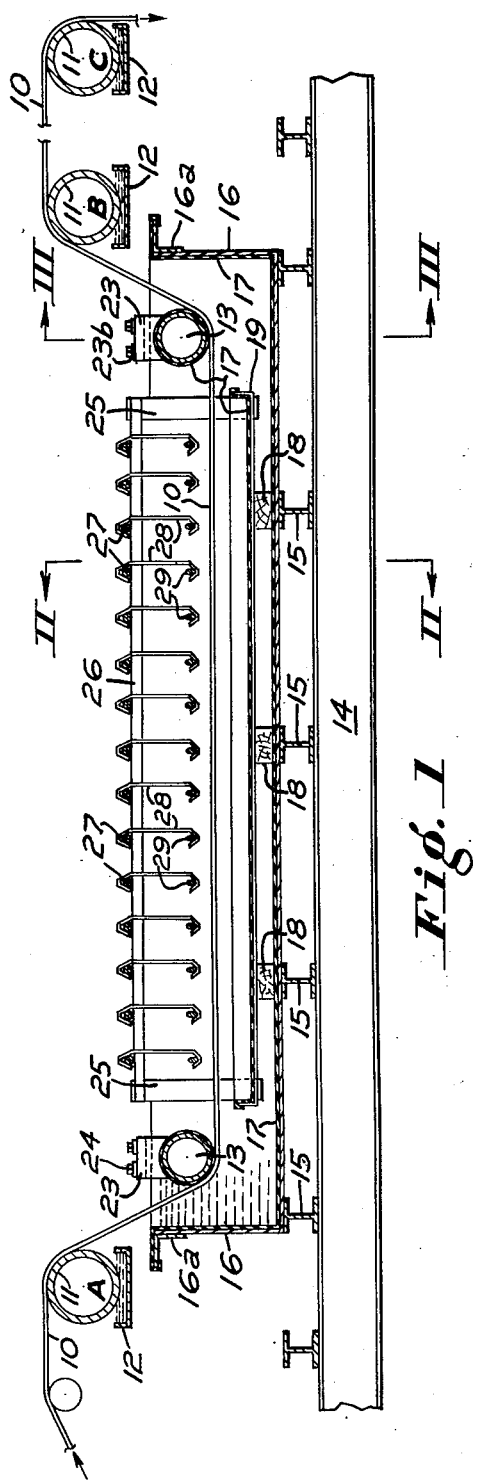
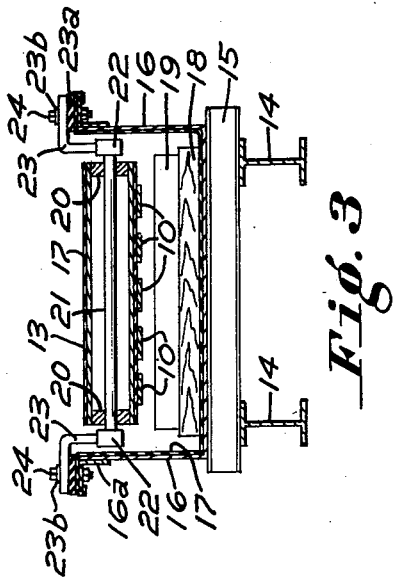
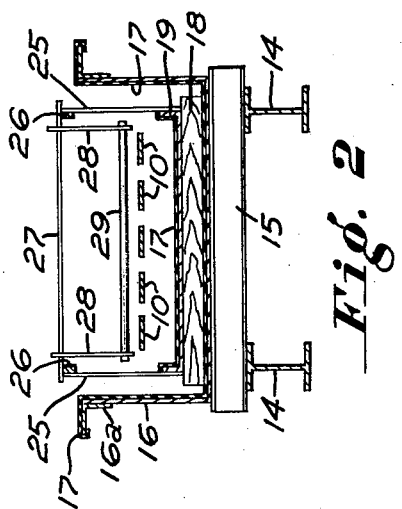
INVENTORS
Robert J. Stock
John McLay
BY
FOR Green, McCallister & Miller
THEIR ATTORNEYS

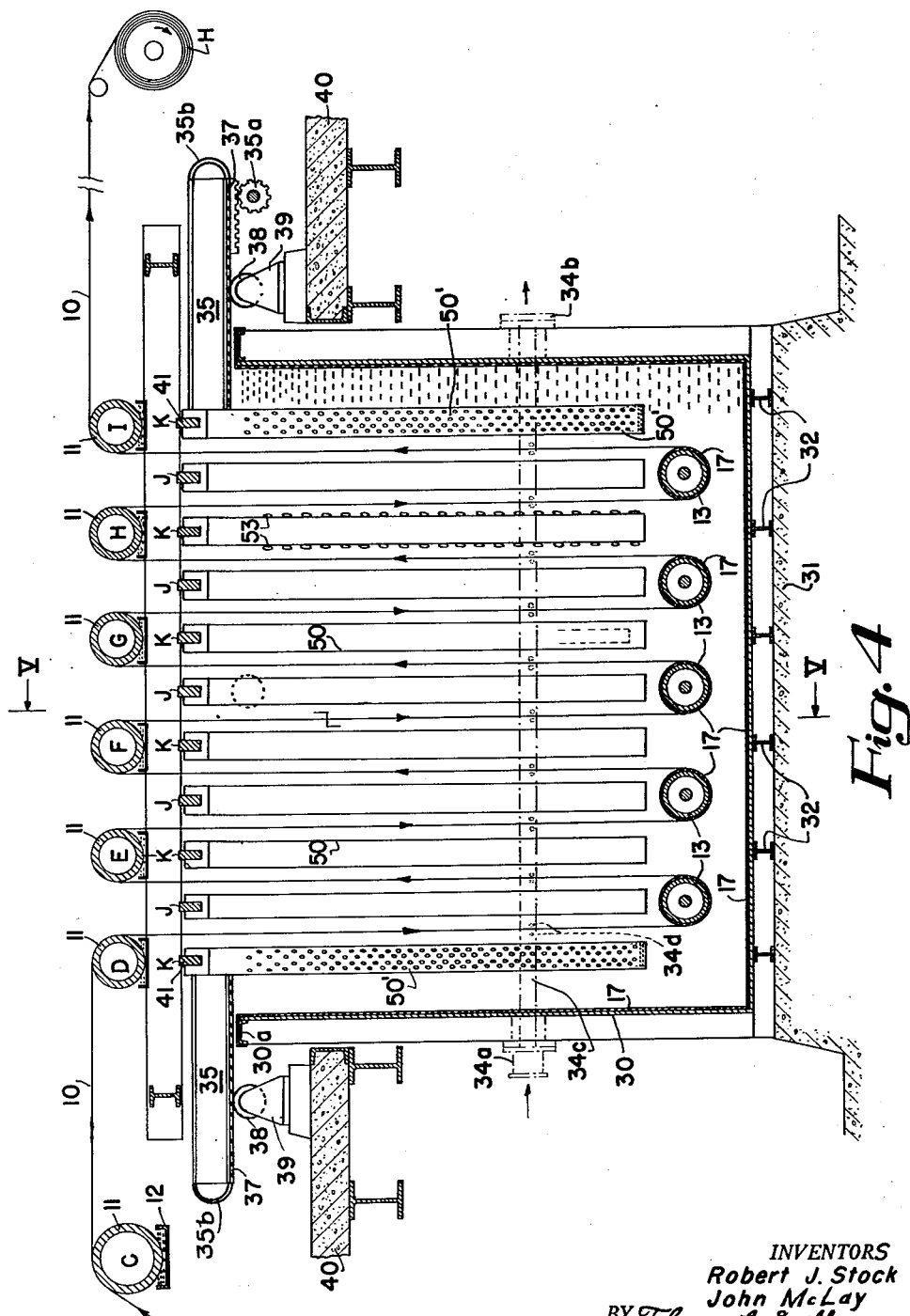

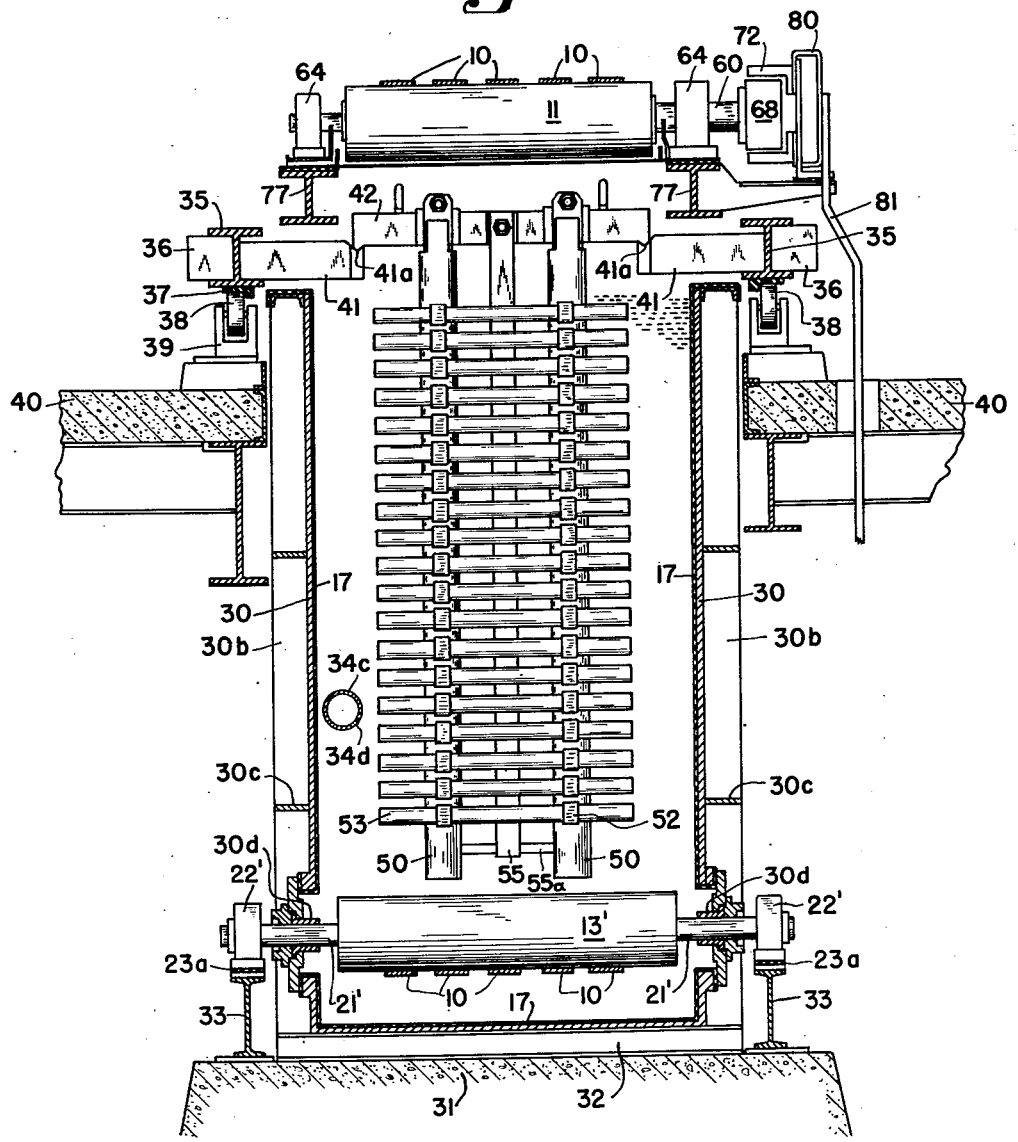

May 28, 1957  R. J. STOCK ET AL  2,793,993
ELECTROLYTIC TREATING APPARATUS
Original Filed April 10, 1950  6 Sheets-Sheet 4
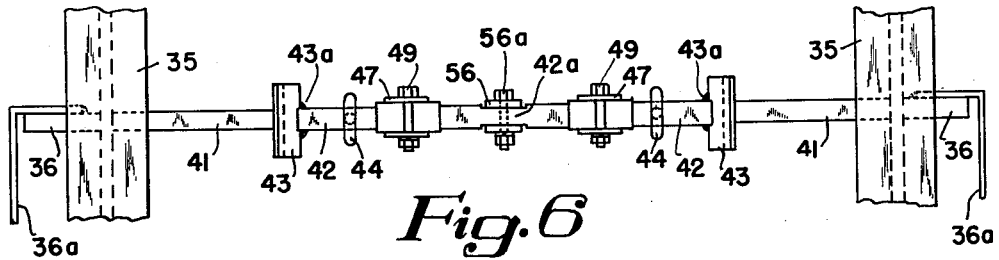
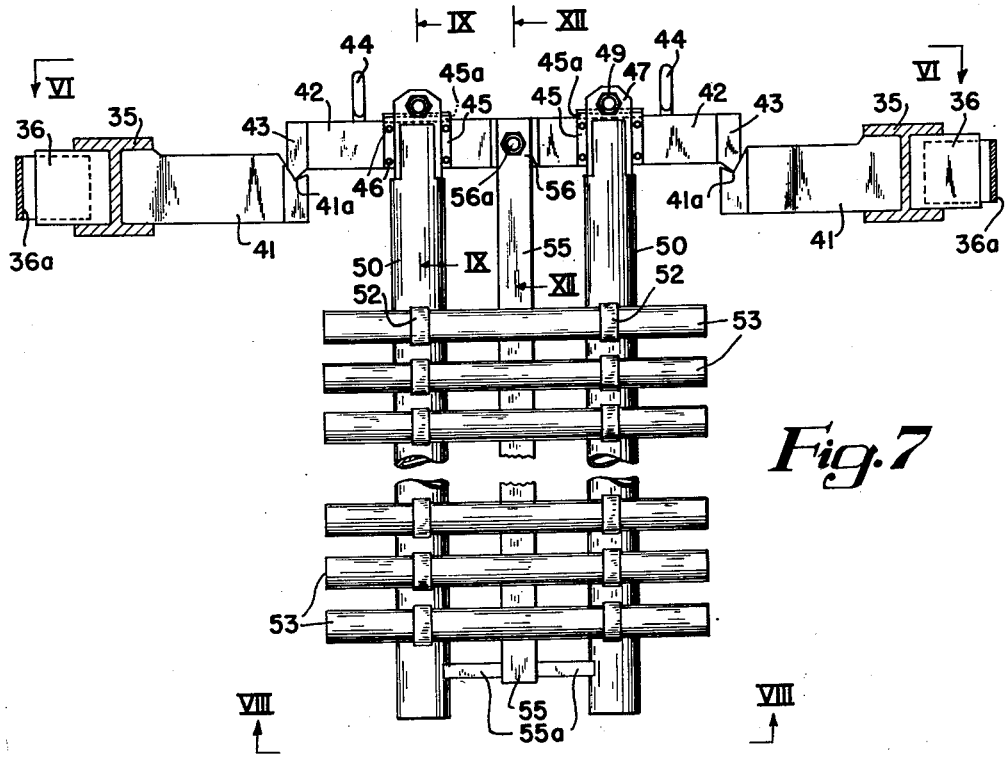
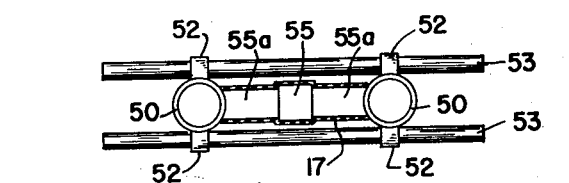
INVENTORS
Robert J. Stock
John McLay
BY Thomas G. Miller
FOR Green, McCallister & Miller
THEIR ATTORNEYS

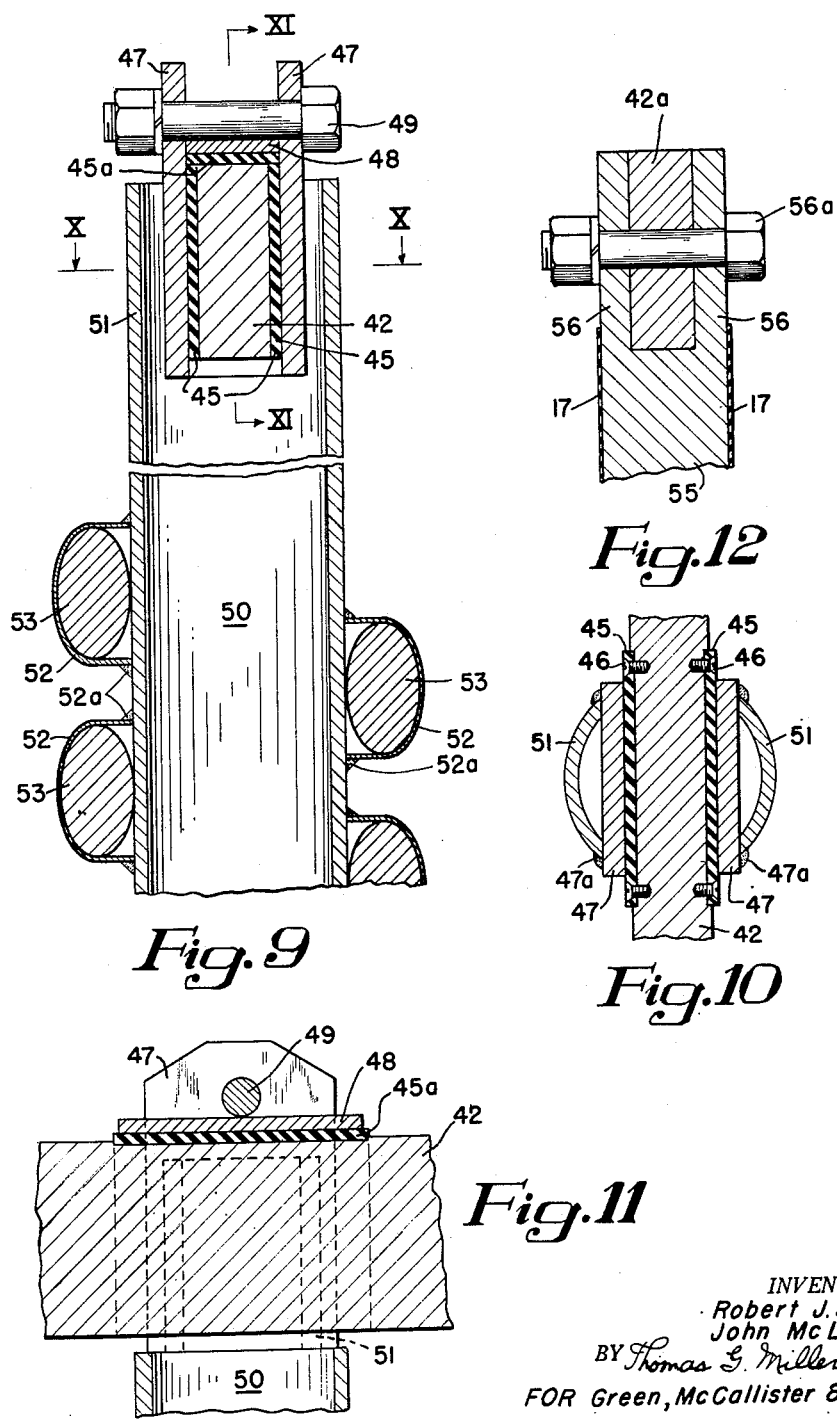

United States Patent Office 2,793,993
Patented May 28, 1957

2,793,993

ELECTROLYTIC TREATING APPARATUS

Robert J. Stock, Watervliet, N. Y., and John McLay, Leechburg, Pa., assignors to Allegheny Ludlum Steel Corporation, Brackenridge, Pa., a corporation of Pennsylvania Original application April 10, 1950, Serial No. 155,056, now Patent No. 2,702,320, dated February 15, 1955. Divided and this application July 21, 1954, Serial No. 444,684

5 Claims. (Cl. 204—206)

This invention pertains to new and improved electrolytic treating apparatus and particularly, to an improved electrode suspension and construction for use therewith and for a continuous treatment of strip metal wherein an improved distribution of current flow is obtained.

One phase of the invention relates to an improved electrode construction and mounting for the electrolytic treatment of strip metal and another phase relates to a construction for providing a more efficient and effective current flow in an electrolytic treating apparatus and particularly, in an electrolytic plating apparatus.

In the electrolytic plating of strip metal, such as strip steel, one or more continuous lengths of the material may be drawn from pay-off reels, through a wiper, an anodic cleaning tank, a rinse spray and scrubber, an acid pickling tank, a rinse spray and scrubber, a strike tank, a plating tank, rinse and spray tanks, a dryer, a powdering apparatus, a pulling unit, and finally to coiling reels. In one or more of these steps, the stock material may be subjected to electrolytic treatment. For example, in the copper plating of steel strip, an electrolytic strike tank and a plating tank require the application of current to the strip to produce the requisite flow for providing, in the case of the strike tank, a preliminary light copper plate or coating in a cyanide bath and in the case of the plating tank, a higher current for the full application of the copper to the requisite thickness on the surface of the material.

This application is a division of our application, Serial No. 155,056, filed on April 10, 1950, now Patent No. 2,702,320, and entitled Electrolytic Treating Apparatus. In this original application, we have pointed out the importance of the contact roll construction as utilized in either a plating or an electrolytic cleaning line. In the present application, we are concerned primarily with the construction of an electrolytic treating apparatus from the standpoint of the bath construction and from the standpoint of the construction and mounting of the electrodes.

In today's operations, it is vital to obtain very thin coatings in a plating operation or to remove thin coatings in a cleaning operation to keep costs down and to avoid waste of the material involved. Requirements as to coating thicknesses are at the present time rather rigid and variations between a series of strips being carried, or along the width of a single strip, gives rise to expensive rejects.

We have found that an important problem or difficulty is encountered in the electrolytic bath, itself. For example, where the material is carried or interleaved in a circuitous path through the electrolyte and the electrodes are supported by a rack construction at various levels in the bath to provide a plating action along the full length of the metal as it interleaves therethrough, we have determined that the upper electrode portions which are connected directly to the bus bars are used up more quickly. That is, the current tends to follow the easiest and shortest path and as a result, the flow from an anode to the strip material tends to be the greatest or to concentrate adjacent the top of the electrolytic bath and to have a progressively decreased flow from the top to the bottom of the bath. As a result, upper anode portions will be used up or eaten away before the bottom portions have any visible deterioration. We thus set out to provide apparatus for insuring a substantially uniform sluffing off or utilization of the electrode material from the top to the bottom of the bath. This, of course, inherently necessitates a substantially uniform action between the full depth of the electrode portions in the bath and the full length of the strip as the latter is interleaved therethrough.

It has thus been an object of our invention to provide a new and improved apparatus for electrolytically treating metal material such as strip;

Another object has been to devise a new and improved form of electrode and connection construction and suspension for use in electrolytic apparatus;

A further object has been to provide new and improved apparatus which will provide a substantially uniform treating action upon the material transversely thereof or across its width as well as longitudinally thereof during its movement through a treating apparatus;

These and many other objects of our invention will appear to those skilled in the art from the following description and the illustrated embodiments thereof.

In the drawings,

Figure 1 is a vertical section taken longitudinally of an electrolytic striking bath employing apparatus of our invention;

Figure 2 is a transverse section in elevation taken along the line II—II of Figure 1 and Figure 3 is a similar section taken along the line III—III of Figure 1;

Figure 4 is a vertical section in elevation taken along an electrolytic plating bath constructed in accordance with our invention and which may follow in progression the striking bath of Figure 1;

Figure 5 is an enlarged vertical end section taken along the line V—V of Figure 4;

Figure 6 is an enlarged fragmental plan showing a detail of a support construction for an electrode rack and is taken along the line VI—VI of Figure 7;

Figure 7 is an enlarged vertical view showing the detail construction of Figure 6 taken transversely of the plating bath in the manner of Figure 5;

Figure 8 is an enlarged bottom view of the electrode rack construction shown in Figure 7 and taken along the line VIII—VIII of Figure 7;

Figure 9 is a greatly enlarged fragmental sectional view in elevation through an electrode rack column showing its mounted relationship and supporting means for electrodes and is taken along the line IX—IX of Figure 7;

Figure 10 is a fragmental section on the scale of and along the line X—X of Figure 9;

Figure 11 is a greatly enlarged sectional detail in elevation to the scale of Figures 9 and 10 taken at right angles to Figure 9 and along line XI—XI thereof;

Figure 12 is an enlarged sectional detail in elevation through a vertical conductor bar and taken along the line XII—XII of Figure 7;

Figure 13:
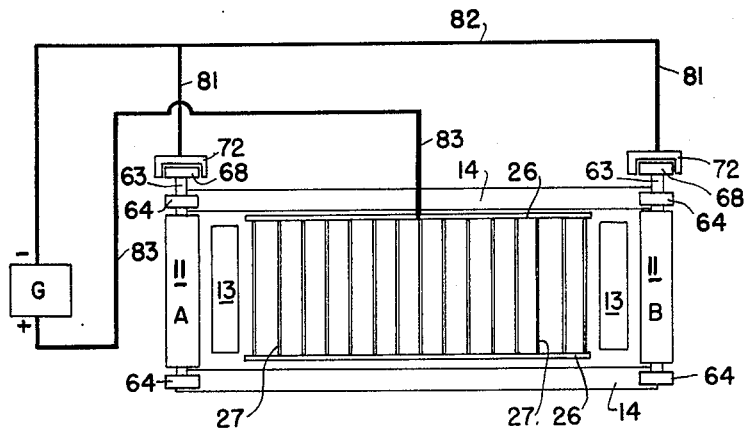
Figure 13 is a somewhat diagrammatic plan view showing how the striking bath of Figure 1 is connected for current energization and Figure 14 is a similar view of the plating bath of Figure 4.

We have been able to solve the problem of a uniform action upon a continuous length of the stock or strip material during its interleaving movement through an electrolytic bath and also of providing a substantially uniform consumption of the various electrodes along the interleaving length of the material. The latter has been accomplished by bringing the electrical connections down into the bath by a separate means and making a bottom contact with the supporting rack parts or vertical column members which carry the electrodes. That is, instead of, as is the ordinary practice, electrically connecting the bus bars to the upper end of the rack construction, we connect them to the lower end of the construction, so that lower electrodes carry the greatest current and upper electrodes carry the least current. As a result, the electrolytic action is substantially uniform along the length of the material in the bath and the electrode material is eaten away substantially uniformly along the depth of the bath.

The electrodes are, of course, anodes in a plating bath and cathodes in a cleaning bath. Instead of connecting positive or negative bus bars to the upper end of the electrode rack, we connect them to an insulated vertical bar or member that extends down into the bath. The vertical member is connected at its bottom end to the electrode rack construction or to baskets which support or contain the electrode material. Thus, the initial greater current becomes effective at the bottom of the bath where it is normally least effective in electrolytic action. The current then must flow upwardly along the rack or basket construction to the various levels of the electrode material. Of course, increased resistance is encountered and thus the current flow is gradually decreased towards the upper reaches of the construction where the electrolytic action is normally greater. This produces a substantially uniform action of the electrode material and a uniform electrolytic action upon the material being treated along its length, regardless of the depth of its particular portions within the treating bath.

For the purpose of illustrating our invention, we have shown equipment which is connected for effecting a plating operation, such as for applying a copper coating to steel strip. The strip may be of a single width strip corresponding to the width of the contact rolls or, as is more customary, may be a series of narrow-width strips positioned in a transversely spaced-apart relationship on the contact rolls and drawn from coils in line through treating apparatus and when the treatment is finished, recoiled at the other end of the line.

To illustrate the utilization of our invention, we have shown apparatus employed in electrolytic striking operation in Figure 1 and apparatus employed in electrolytically applying a metal coating in Figure 4.

Referring to Figures 1, 2 and 3, a strip 10 is carried over a contact roll at position A. The roll 11 is shown positioned with its lower portion extending slightly into a water tray 12 to keep it moist. The strip 10 is supplied with current of negative potential by the contact rolls 11 at positions A and B that represent opposite longitudinal ends of a striking bath metal container 16 and is guided substantially longitudinally therethrough by a pair of end-mounted, submerged guide rolls 13. The container 16 may be filled with a suitable striking liquid, such as copper cyanide, and has an inner, non-conductive coating or layer 17, such as of a rubber that is resistant to the bath liquid. The container 16 is mounted on longitudinal and transverse beam members 14 and 15 and carries an electrode metal catch and support tray 19. The tray 19 rests upon wood or other insulating cross members 18 to space it and position it with respect to the bottom of the container 16. A pair of vertical upright pieces 25 are secured to side flanges of the tray 19 at opposite longitudinal ends thereof and are secured to a pair of longitudinally-extending bus bars 26 to form an electrode frame construction. A series of cross rods 27 are secured in a spaced-apart relationship along the bus bars 26 and serve as hanger bars for a plurality of removable electrode hooks 28.

As shown particularly in Figures 1 and 2, electrodes 29 are adapted to rest in the lower portions of the hooks 28 and to be supplied with positive current where the bath is used for a preliminary or striking plating operation. The tray 19 has a protective, non-conductive, inner coating 17 and serves to catch any electrode material falling away from the hooks 28 and to support scrap electrode material therein. In this manner, electrode material is positioned on opposite sides of the strip 10 as it moves through the bath container 16.

In Figure 3, I have shown a detail of the construction of the guide rolls 13. As seen, each guide roll 13 has an insulating coating 17 thereon or about its periphery and has end hub portions 20 which are secured on an axle shaft 21. The axle shaft 21 is rotatably carried by bearings 22 which are suspended from side rims or flanges of the bath container 16 by angle support members 23. As will be noted, the side rims of the container 16 are reinforced by longitudinally-extending angle members 15a. Insulation of rubber, Micarta or other similar material 23a insulates the angle support 23 from the bath container 16. Bolt and nut assemblies 24 secure the supports 23 in position through insulating sleeves 23b. The contact roll construction is the same as that employed for the main plating bath and for this reason, will not be described at this point.

Referring to Figures 4 and 5, we have shown a plating bath construction which includes a metal container 30 having a reinforcing top rim or flange 30a and reinforcing side flange portions 30b and 30c, see Figure 5. The container 30 has a nonconducting inner coating 17 and rests upon cross beams 32 of a floor mount 31. To provide circulation of the plating liquid within the container, we have shown an inlet 34a and an outlet 34b which may be connected to a pumping system, see Figure 4. A conduit 34c extends across the bath between the inlet 34a and the outlet 34b and has a series of spray openings 34d at spaced locations therealong, see Figures 4 and 5.

As shown particularly in Figure 4, the strip 10 moves from a contact roll 11 at position C over a second contact roll 11 at position D, vertically downwardly into the liquid of the container 30, over a guide roll 13' which is of similar construction to the roll 13 of Figure 3, and then vertically upwardly to a second contact roll 11 at position E. Its interleaving relationship is continued over contact rolls 11 at positions F, G, H and I. The strip 10 may then move through rinse and spray tanks, a powdering unit, and (tension) pulling unit, and to coiling reels at position H.

As shown in Figure 5, the rolls 13' have a shaft 21' which extends through sealing-off bushings 30d, through the container, and into bearings 22'. Each bearing 22' is mounted on a side beam 33 through insulating material 23a of Micarta or rubber.

An overhead support frame 35 having longitudinal and connecting longitudinal side I beams or members carries bus bars 36 along its longitudinal sides and has a pair of wear-resistant, insulating tracks 37 which are secured to the bottom flanges of its longitudinal side members and are adapted to ride on rollers 38. The rollers 38 are rotatably mounted on upwardly-extending vertical brackets 39, carried by floor structure 40. As shown particularly in Figure 4, the ends of the frame 35 have end handles or loop portions 35b to which a crane hook may be connected or which may serve as hand grips. A gear and rack mechanism 35a is mounted at one end of the frame 35 to hold it in an adjusted position. It will be apparent that the frame 35 can be moved longitudinally on the rollers 38 by gripping an appropriate one of the handle portions 35b.

Since, as will be explained, the electrodes are carried by the overhead support frame 35, such movement facilitates the removal of electrode racks and of the electrodes, themselves, from the bath. Referring to Figure 4, after the electrode racks indicated by positions J have been lifted out or removed, the electrode racks indicated by the positions K can then be removed by moving the frame 35, until these racks are out of vertical alignment with or clear of the contact rolls 11.

Referring particularly to Figures 5 to 11, inclusive, the frame 35 carries between its inner flanges a series of pairs of transversely-inwardly extending and longitudinally spaced-apart short length support bars or arm members 41, see Figures 4, 5, 6 and 7. An intermediate hanger bar or cross members 42 is provided with welded-on knife edge portions 43 at each end thereof that are adapted to rest in knife grooves 41a of the pair of the arm members 41. The weld is indicated as 43a. Loop portions 44 are secured to the carrier bar 42 and extend upwardly therefrom, so that a crane or hoist can be hooked thereon to raise the construction off the arm members 41 when electrodes are to be replaced. It will thus be apparent that bus bar connections 36a (see Figures 6 and 7) to bus bar pairs 36 supply current through the frame 35 to the arm member pairs 41 and to the cross members 42.

To suspend electrodes 53 in a vertically spaced-apart, horizontally-extending relationship within the bath, we suspend a pair of steel support columns 50 of hollow cylindrical-like or tubular-like construction from each cross member 42. As shown in Figures 6 and 7, the columns 50 of each pair are secured to one hanger or cross member 42, but are electrically insulated therefrom. To effect this result, see particularly Figures 9 to 11, each column 50 has an upper end portion 51 that is bifurcated to fit over the hanger member 42, as shown in Figure 10. Heavy insulating pieces 45 which may be of Micarta are inset within the member 42 and are secured thereto by inset screws 46 which may be of plastic construction. A pair of vertically-projecting positioning plate members 47 are held in a spaced-apart relationship with respect to each other by a horizontal metal spacer member 48 extending therebetween which is adapted to rest upon an upper insulating member 45a. The member 45a is secured in the same manner as the members 45 to the top of the hanger member 42. The bifurcated end portion 51 is welded at 47a to the members 47 to extend downwardly therefrom. A bolt and nut assembly 49 extends through the members 47 and secures each column 50 in a supported, but electrically insulated position to hang downwardly from the member 42.

Clamp brackets 52 extend in a staggered relationship from opposite sides of each column 50. The clamp brackets 52 have a vertically spaced-apart relationship along each column 50 and are horizontally aligned with clamp pieces on corresponding sides of the other column of the same pair. Thus, it will be noted that each hanger member or cross bar 42 carries a pair of transversely spaced-apart columns 50 and that aligned brackets 52 of each side of these two columns provide two points of support for each electrode 53. As shown in Figure 9, electrodes 53 on opposite sides of each column 50 have a staggered relationship with each other.

To supply current to the electrodes 53 through columns 50, we have provided a vertically or downwardly-extending insulated conductor bar 55 that may be of steel. As shown particularly in Figures 6, 7, 8 and 12, the conductor bar 55 has an upper bifurcated end portion 56 which slides over an offset or depressed portion 42a of the member 42 and is secured thereto in an electrically-conducting relationship therewith by a bolt and nut assembly 56a. At its lower end, the conductor bar 55 is provided with a pair of opposite, horizontally-extending or cross arm connector pieces 55a which are welded thereto and are at their ends welded between the columns 50 of each pair. In this way, current from the bus bars 36 is conducted to each pair of arm members 41, to the hanger member 42, and directly to the bottom of each conductor bar 55 and from it to the lower ends of a pair of the columns 50. The conductor bar 55 and its pieces 55a are shown provided with an insulating coating 17 thereabout to protect them from the action of the plating bath, or in other words, to insure that the electrolytic action will be effected only through the columns 50 and their electrodes 53. If the operation is a copper plating operation, the electrodes 53 will be copper anodes and are preferably, as shown, of elliptical shape.

As shown in Figure 4, columns 50' of the end pairs may be of slightly different construction than the columns 50 of the intermediate pairs. That is, they are illustrated as perforated along their lengths and closed at their ends to receive electrode material therein. A conductor bar 55 is provided for each end column pair and is connected in the same way as the conductor bars for the columns 50. The columns 50' illustrate that scrap electrode material can also be utilized.

From Figure 7, it will be apparent that each electrode rack, comprising cross bars 42, columns 50 or 50', and conductor bar 55 can be lifted out of the container 30 when the electrodes 53 have been consumed. New electrodes can then be slidably inserted in the clamp brackets 52 and the electrode rack again positioned to rest on knife edge grooves 41a.

In Figure 13, we have diagrammatically shown an electrical layout for the striking tank of Figure 1. The generator G is connected at its negative terminal 82 to two parallel branches 81 and from them through the brush mounting brackets 72 to the commutator or contact wheel 68 and from it to the contact rolls 11. The positive side of the generator G is connected through line 83 to the bus bars 26 which support the anode frame.

Figure 14:
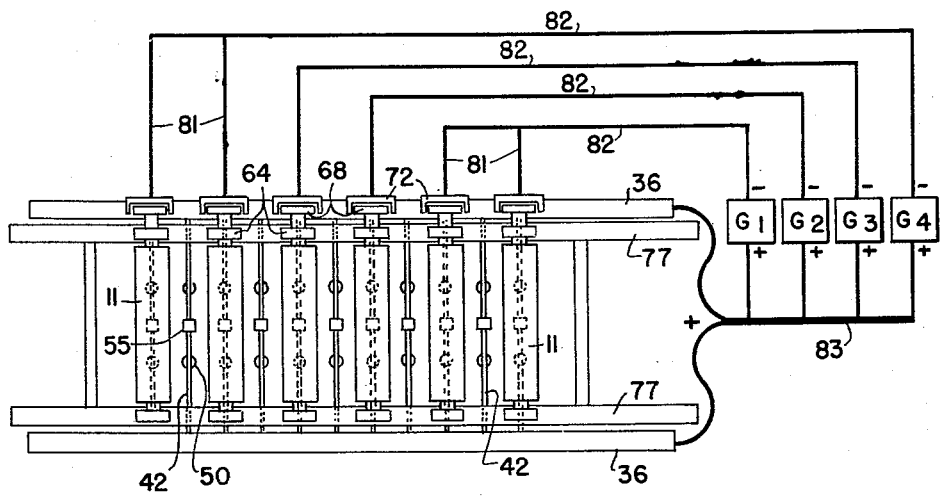

In Figure 14, we have shown a suitable electrical layout for plating bath of Figure 4, wherein a series of generators $G_1$, $G_2$, $G_3$ and $G_4$ have their positive terminals connected in parallel to line 83 which is connected to the longitudinally-extending bus bars 36 along the sides of the container 30. Generator $G_1$ is connected at its negative side through line 82 and branch lines 81 to two leading contact rolls; generator $G_2$ is connected at its negative side through a line 82 to an intermediate contact roll 11; generator $G_3$ is connected in the same way to another intermediate contact roll 11; and, generator $G_4$ is connected through line 82 and branch lines 81 to the last two contact rolls in the progression of the strip through the bath. Ordinarily, about six volts is sufficient and it will give an effective plating voltage at the contact roll surface of about five volts. The starting amperage may be about 20,000 total with the intermediate rolls carrying about 5,000 amps. each and the end roll pairs carrying about 6,000 amps. each.

Previous to our invention, the width of strip which could be effectively treated was limited. For example, in a plating operation a poor coating was obtained with a width of strip of 18 inches and this constituted the absolute maximum width dimension. Now, employing our invention, an 18, 20, or wider inch strip can be substantially uniformly coated in an effective manner without any difficulty. We provide an intermediate connection to each contact roll 11 through non-ferrous parts. Furthermore, the tendency of direct current to hug the ends of the rolls is utilized in obtaining an efficient flow of current towards such ends without the counter-flow currents incident to the previous method of connecting each roll end to the supply of current.

What we claim is:

1. In an improved electrolytic treating apparatus for continuously treating electrically-conductive strips within a solution of a bath container having contact rolls operably mounted above the level of solution of the container and electric connections of one potential to the contact rolls, the combination of a support structure positioned above the container and connected to electrical current of opposite potential, at least one cross member suspended from said support structure, at least one column suspended from said cross member and extending into the solution of the container, electrode material carried by said column along its length, means positively insulating said column from said cross member at its point of suspension thereon, a conductor bar independently suspended from said cross member in a transversely spaced-apart relation with said column and extending into the solution of the container in such a spaced-apart relationship with respect to said column, said conductor bar being electrically connected to said cross member at its point of suspension thereon, cross arm means extending across transverse spacing between and electrically connecting a lower portion of said conductor bar to a lower portion of said column to supply the only current of opposite potential to said column, so that current will only flow upwardly along said column to energize the electrode material carried thereby.

2. In an improved electrode construction for an electrolytic treating bath having a bath container, a frame construction positioned above the container; a series of transversely-extending, longitudinally spaced-apart conductor bar pairs extending transversely-inwardly of the frame structure; each conductor bar having a knife edge portion adjacent its inner end, a cross bar for each pair of said conductor bars and having knife edge portions adjacent each of its ends adapted to rest upon the knife edge portions of said conductor bars, a pair of support columns extending from each of said cross bars into the container in a transversely spaced-apart relationship with respect to each other, means insulating said pair of support columns from said cross bars, a plurality of electrodes, brackets on said support column pairs for carrying said electrodes therebetween, a conductor bar electrically connected to and extending from each said cross bar intermediate said support column pairs into the container, said last-mentioned conductor bar being electrically connected at its extending end to said column pairs to supply electrical current to the extending ends of said column pairs and through them to the electrodes carried thereby at a location remote from said cross bar.

3. An improved electrode construction as defined in claim 2 wherein said last-mentioned conductor bar has insulation along its length to protect it from liquid in the bath container.

4. An improved electrode construction as defined in claim 2 wherein, said electrodes are carried by said brackets on opposite sides of said support column pairs, and the electrodes on one side of said column pairs have a staggered relationship with respect to the electrodes on the opposite side thereof.

5. In an improved electrolytic treating apparatus for treating metal strip within a solution in a bath container, a support structure positioned above the container, at least one cross member suspended from said support structure and transversely across the container, a pair of support columns extending from said cross bar into the container in a transversely spaced-apart relationship with respect to each other, means insulating said pair of support columns from said cross bar, a plurality of electrodes projecting transversely between said columns in a vertically spaced-apart relationship with each other within the container, a conductor bar electrically connected to and extending from said cross member intermediate said support columns into the container, said conductor member being electrically connected at its extending end to said column pair to supply electric current to the extending end of said column pair and through them to the electrodes carried thereby at a location remote from said cross member.

References Cited in the file of this patent

UNITED STATES PATENTS

| 1,208,584 | Laughlin | Dec. 12, 1916 |
| 1,250,757 | Antisell | Dec. 18, 1917 |
| 1,478,853 | Haas | Dec. 25, 1923 |
| 2,086,224 | Hendricks | July 6, 1937 |
| 2,331,320 | Hartzell | Oct. 12, 1943 |
| 2,382,018 | Martin | Aug. 14, 1945 |